UNITED STATES PATENT OFFICE.

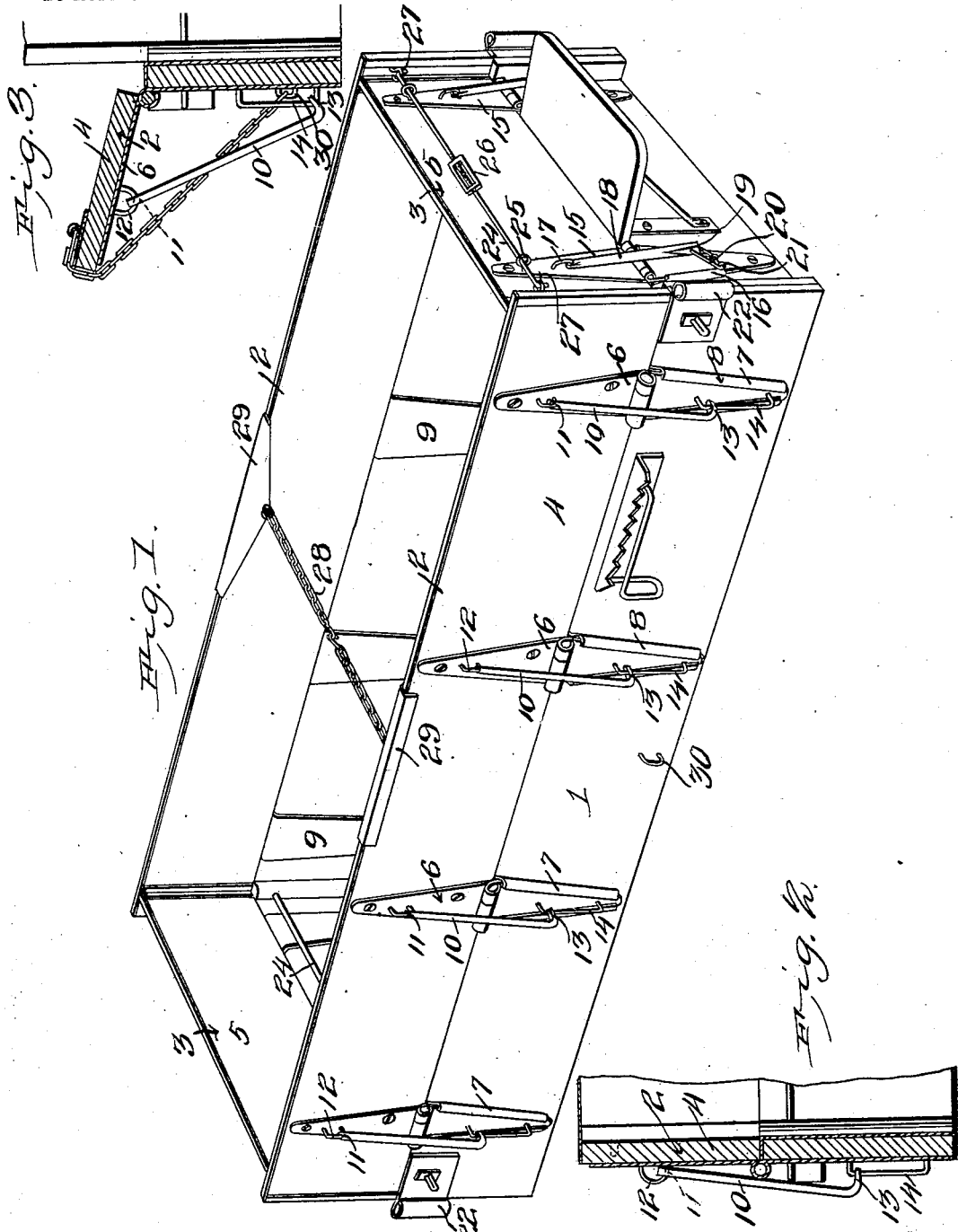

HARVY S. CUNNINGHAM, OF SHELBYVILLE, TENNESSEE.

COMBINED WAGON-BODY AND HAY-RACK.

SPECIFICATION forming part of Letters Patent No. 722,678, dated March 17, 1903.

Application filed March 29, 1902. Serial No. 100,621. (No model.)

*To all whom it may concern:*

Be it known that I, HARVY S. CUNNINGHAM, a citizen of the United States, residing at Shelbyville, in the county of Bedford and State of Tennessee, have invented a new and useful Combined Wagon-Body and Hay-Rack, of which the following is a specification.

The invention relates to a combined wagon-body and hay-rack.

The object of the present invention is to improve the construction of wagon-bodies and to provide a simple and comparatively inexpensive one designed for use for all the purposes to which an ordinary wagon may be put and capable of being readily arranged to form a hay-rack.

The invention consists in the novel combination and arrangement of parts hereinafter fully described, illustrated in the accompanying drawings, and particularly pointed out in the claim hereto appended.

In the drawings, Figure 1 is a perspective view of a combined wagon-body and hay-rack constructed in accordance with this invention. Fig. 2 is a vertical sectional view of one side of the same. Fig. 3 is a similar view, the upper hinged side being swung downward to form the side of a hay-rack.

Like numerals of reference designate corresponding parts in all the figures of the drawings.

1 designates a wagon-body composed of sides and ends 2 and 3 and having a bottom of the ordinary construction and designed to be mounted on a running-gear in the usual manner. The wagon-body has mounted upon it upper hinged sides 4 and ends 5, adapted to be arranged, as illustrated in Fig. 1 of the drawings, to form a top box for a wagon-body when it is designed to use the latter for any purpose to which an ordinary wagon-body may be put, and the upper hinged sides and ends are adapted to be swung downward to an inclined position to form a hay-rack. The sides 4 are connected to the sides of the wagon-body by hinges 6, composed of upper and lower leaves or bars and having a pintle arranged at the upper edge of the sides of the wagon-body. The upper leaf or bar is secured to the hinged top side 4 and the lower leaf or bar is arranged within a sheath or socket 7 and is tapered similar to the top leaf. The sheath or socket consists of a plate or bar provided at its side edges with upright side flanges 8, converged toward the bottom of the hinge and receiving the side edges of the lower leaf. The sheath is preferably formed integral with an inner strap or bar 9, which is arranged on the inner face of the side 2 and which preferably extends to the bottom of the same. The sheath is connected within a bar at the top by a transverse portion which extends across the upper edge of the side of the wagon-body.

The hinged side 4 is supported in an inclined position by a series of inclined braces 10, hinged to the upper leaf and slidably connected with the lower leaf of each hinge. Each bar or brace 10 is provided at its upper end with an eye 11, which receives a loop or eye 12 of the upper leaf, and the lower end of the brace 10 is extended inward to form a short arm 13, which is provided with an eye or opening for the reception of an elongated loop 14, forming a guide for the lower end of the brace and consisting of a rod having its ends bent inward and secured to the hinge. When the hinged upper side 4 is swung downward to the position shown in Fig. 3, the brace drops to the bottom of the guide of the lower leaf and supports the upper hinged side 4, as shown. The eye or opening 11 at the upper end of the brace and the loop or eye 12 of the upper leaf form a hinge joint or connection, which permits the brace to swing inward and outward, the said loop or eye 12 being approximately semicircular, as clearly shown in Figs. 2 and 3, to permit this operation.

The ends of the upper portion of the wagon-body are connected with the ends of the wagon-body proper by means of hinges 15, composed of tapering upper and lower leaves, the lower leaves being arranged in semisockets or sheaths 16, consisting of plates secured to the ends of the wagon-body and provided with downwardly-converging flanges to receive the lower leaf. The upper leaf is provided with a loop or eye 17 to receive the upper end of a brace 18, which is perforated at its upper end similar to the side braces. The lower end 19 of the brace is perforated for the reception of a link 20, which is triangular and which has its lower transverse portion or base arranged in eyes 21 of the lower leaf of the end hinge. The link is adapted to swing upward and downward as the end 5 is raised and lowered, and when the end 5 is swung downward the brace and the link will support the said end 5 in an inclined position.

The sides 2 of the wagon-body are provided at their ends with sockets 22 for the reception of standards when the device is used as a hay-rack, and these sockets, which may be constructed in any suitable manner, preferably consist of plates doubled to form a loop or socket and having the side portions beyond the socket perforated for the reception of end rods 23, which extend across the wagon-body.

The sides 4 are connected by end rods 24, composed of two sections arranged in inner and outer eyes 25 of the ends 5 and connected at their inner terminals by a turnbuckle 26 and provided at their outer ends with hooks for engaging eyes 27 of the sides 4. The turnbuckle is adapted to enable the rods to be readily strained to the desired tension, and it will also enable the rods or sections to be loosened when it is desired to disengage the hooks from the eyes of the sides 4 when it is desired to swing the said sides 4 and ends downward to form a hay-rack. The sides 4 are connected at an intermediate point by short chains 28, secured at their outer ends to the upper portions of the sides 4 by means of plates or caps 29, and the inner ends of the short chains are provided with hooks for engaging each other. The hooks interlock with each other or with the adjacent links of the chains when the sides 4 are in an upright position. The chains are also adapted to be arranged as shown in Fig. 3, and when the hinged sides 4 are swung downward to form a hay-rack the chains are brought outward over the outer edges of the said sides and are carried down and engaged with eyes 30, mounted on and extending from the sides 2 of the wagon-body proper. The chains when arranged in this manner will prevent the hinged sides 4 from rattling and will maintain them firmly supported by the braces of the hinges.

It will be seen that the wagon-body is adapted to be employed for all the purposes to which an ordinary wagon may be put, that the hinged sides and ends 4 and 5 are adapted to be readily swung downward to an inclined position to form a hay-rack, and that in changing from a hay-rack to a wagon, and vice versa, the parts of either do not have to be removed from the running-gear.

Instead of employing tapered hinges and the tapering sheaths ordinary oblong hinges may be provided, and I desire it to be understood that various changes in the form, proportion, size, and the minor details of construction within the scope of the appended claim may be resorted to without departing from the spirit or sacrificing any of the advantages of this invention.

What I claim is—

In a combined wagon and hay-rack, the combination of a wagon-body and an upper movable side adapted to be arranged either in an upright or an inclined position, a hinge composed of two leaves, one of the leaves being secured to one of the said parts, a socket mounted on the other part and detachably receiving the other leaf of the hinge, an elongated loop mounted on the lower leaf of the hinge and carried by the same, and a brace hinged to the upper leaf and provided with an eye slidable on the elongated loop, substantially as described.

In testimony that I claim the foregoing as my own I have hereto affixed my signature in the presence of two witnesses.

HARVY S. CUNNINGHAM.

Witnesses:
C. C. SMITH,
STANLEY S. WARREN.